J. C. DE LANEY.
MOLDING BLADE AND SAW.
APPLICATION FILED JUNE 2, 1914.
1,167,801.
Patented Jan. 11, 1916.
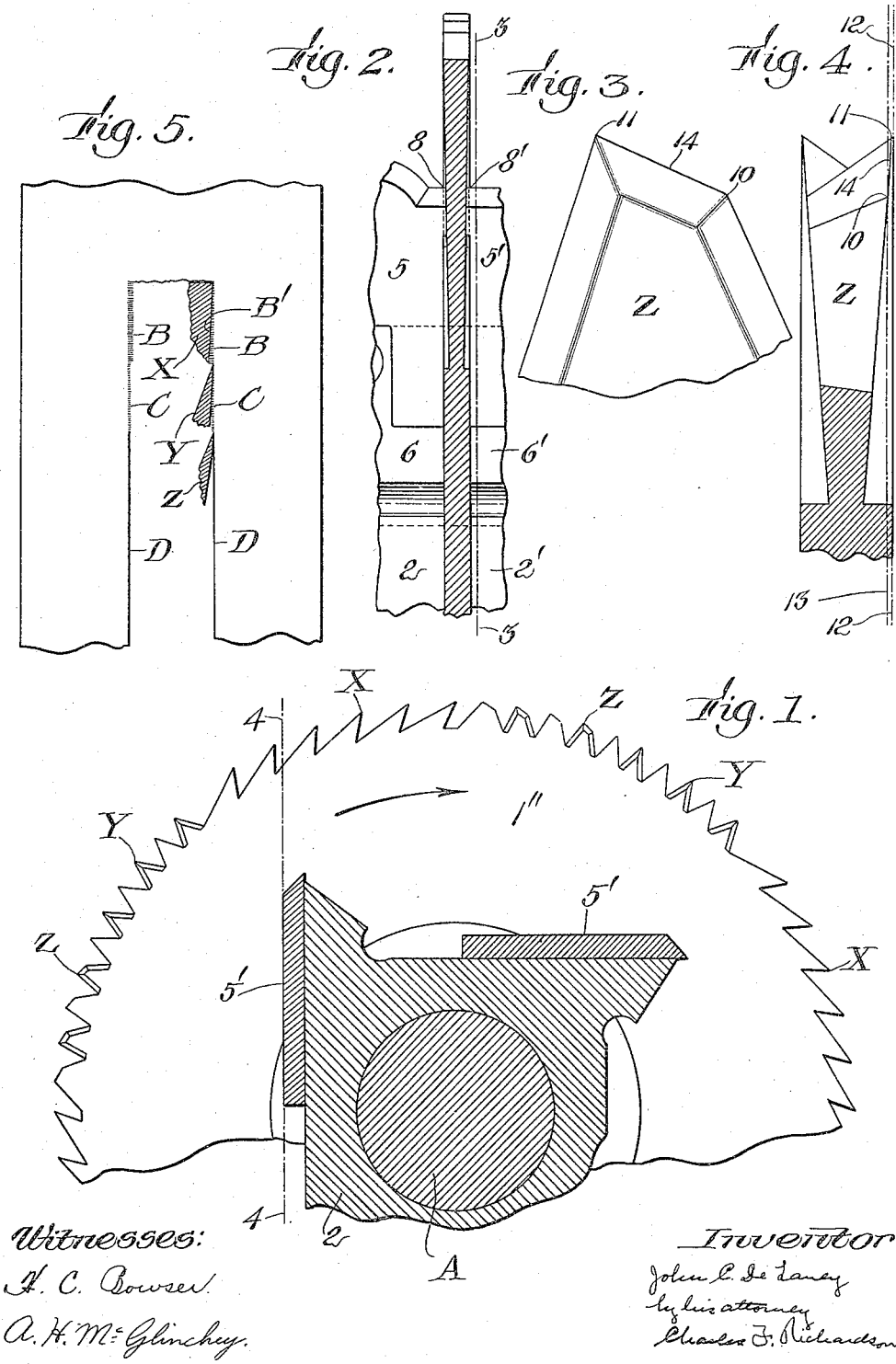

UNITED STATES PATENT OFFICE.

JOHN C. DE LANEY, OF WATERTOWN, MASSACHUSETTS.

MOLDING BLADE AND SAW.

1,167,801.  Specification of Letters Patent.  Patented Jan. 11, 1916.

Original application filed January 16, 1913, Serial No. 742,429. Divided and this application filed June 2, 1914. Serial No. 842,509.

*To all whom it may concern:*

Be it known that I, JOHN C. DE LANEY, a citizen of the United States, residing at Watertown, in the county of Middlesex and State of Massachusetts, have invented certain new and useful Improvements in Molding Blades and Saws, of which the following is a specification, reference being had therein to the accompanying drawings.

My device is especially adapted for separating a single piece of stock into two or more molding strips and its particular object is to make the cut edges of the strips smooth and without visible marks. This object is attained by the means illustrated in the accompanying drawing, in which—

Figure 1 is a transverse section on the line 3—3 of Fig. 2 of a separator arbor showing one of the separators in side elevation; Fig. 2 is a vertical sectional view on the line 4—4 of Fig. 1; Fig. 3 is an enlarged elevation of one of the shaving teeth; Fig. 4 is an enlarged sectional view through the edge of the separator, showing one of the shaving teeth in edge elevation and a portion of a like tooth to the rear thereof; and Fig. 5 illustrates, in an exaggerated way, in plan, the condition of the kerf brought about by, say, two of the opposite teeth of each of the groups of teeth in one quadrant of the separator, the teeth forming the left side of the kerf being omitted to show the successive fibers, and their tendency to fill out into the kerf; while the teeth operating on the right side, are shown performing their intended functions, and the fibers frictionally engaging the sides of the operating teeth.

Upon an arbor A of the molding cutter, Fig. 1, may be suitably mounted one or more separators 1″ and two or more molding heads 2, 2′, alternately arranged. Each separator may be described as "hollow" or "concave," that is, the opposite side surfaces of each separator gradually near each other in their approach toward the center of the separator, and lie within the planes containing the sides of the separator teeth. Two or more molding blades, 5, 5′, each having a cutting edge of the desired contour, are properly fixed to their seats in their respective molding heads, 2, 2′. Each blade as 5′, has a portion of its side and cutting edge extend through the plane containing the sides of the saw teeth, and into contact with the surface of the side of the separator, so that the said plane and that of the cutting edge of the blade intersect as at 8′. It is by reason of this intersection that the surface of the molding is smooth to the very edge of the molding formed by the separator, and as will later appear, when my specially formed teeth are used, a smooth edge and sharp corner of the molding is obtained.

The arrangement and kind of separator teeth, preferred by me to coöperate with the cutter blades, are shown in Fig. 1. Each quadrant of this separator has three groups of teeth, viz:—splitting or non-radial teeth X, with, say, 10° draw cut, which have a tendency to tear the wood in severing the stock lengthwise, and leave the sides of the kerf with loose fibers B, Fig. 5, that press as at B′ against the sides of the separator and tend partially to fill up the kerf:—a row of radial pointed teeth Y which follow, and smooth the sides of the kerf, by removing the fiber B due to the operation of the splitting teeth X, the teeth Y leaving marks C upon the smoothed sides or edges of the adjacent moldings:—and a row or group of double pointed edge shaving teeth Z, which constitute a very important feature of my invention, and make the sides of the kerf absolutely smooth and free from saw markings C, as at D. It will be noticed that these teeth Z, Fig. 1, occupy fewer degrees of the quadrant of the separator than do the teeth Y; and the latter a fewer number than do the splitting teeth X; the reason being that by such an arrangement the radial pointed teeth Y and the edge shaving teeth Z may operate only on the sides of the kerf, and in no way affect the efficiency of the splitting teeth.

Further, by the combination of the splitting, the radial, and the shaving teeth, arranged as they are, the material for the molding may be fed to the separator with the speed that can be taken care of by the splitting teeth, which is much greater than would be the case were they omitted from the combination; in fact, unless the speed of the feed is that determined by the splitting teeth of the separator, the separator would be of no practical value, consequently said teeth are essential to permit the desired speed of feed, and to the removal of enough material, to allow the radial and the shaving teeth to do their respective work, at said speed.

The novelty of each tooth Z, Figs. 3 and 4, resides in the fact that it has two points 10, and 11, one in advance of the other, each lying in its respective plane 12, 13 at right angles to the rotative axis of the separator, the radius of the forward point 10 of the separator being less than that of the rear point 11, so that the cutting edge 14 connecting the forward inner point 10 with the following outer point, as compared with prior teeth, is long, and forms a sharp acute angle not only with the plane of the saw when projected thereon, as in Fig. 3, but also with the planes 12, 13 containing the forward and the rear point of the tooth; so that for a given rate of feed of material, each fiber of wood is, for the same depth of cut, subjected finally to a longer and slower shearing action of the cutting edge, than has heretofore been the case; the resulting surface of the kerf therefore, being very much smoother than has been previously obtained, and permitting the splitting teeth to pass by without frictional contact, the finally smoothed edge and corner of the molding; it being understood, of course, in case kiln-dried or warped lumber is being worked up, that the separator is rigidly supported all the while by the contacting sides of the molding blades and absolutely bound to operate in one plane only. The sharp cutting blades of the molding head coöperating with the shaving teeth, produce an unusually smooth edge and sharp corner on the molding.

As the operation of my invention seems evident, further description of it appears needless.

Desiring to protect my invention in the broadest manner legally possible, what I claim is:—

1. In a separator for splitting and smoothing the sides of the kerf formed by the splitting, a series of teeth each having front and rear points with a cutting edge extending therebetween forming a long drawing cutting edge, said front point lying in a plane parallel to and within the plane of said rear point, whereby said cutting edge will gradually cut toward the side of the kerf from the front to the rear point.

2. A separator for splitting and smoothing the sides of the kerf formed by the splitting, comprising a circular blade having sides which are hollow-ground from the peripheral edges toward its hub, a series of splitting, radial and shaving teeth formed around the edge of said blade, each of said shaving teeth having front and rear points with a cutting edge extending therebetween, said front point lying in a plane parallel to and within the plane of said rear point, whereby said cutting edges of the shaving teeth will gradually cut toward the side of the kerf from the front to the rear point.

3. A separator for splitting and smoothing the sides of the kerf formed by the splitting, comprising a circular blade having sides which are hollow-ground from the peripheral edges toward its hub and having in each of its quadrants a series of splitting, radial and shaving teeth formed around the edge of said blade, each of said shaving teeth having front and rear points with a cutting edge extending therebetween, said front point lying in a plane parallel to and within the plane of said rear point, whereby said cutting edges of the shaving teeth will gradually cut toward the side of the kerf from the front to the rear point, said splitting teeth covering the largest portion of the periphery of each quadrant, the radial teeth covering a less portion, and the shaving teeth a still less portion than the radial teeth.

In testimony whereof I hereunto affix my signature in the presence of two witnesses.

JOHN C. DE LANEY.

Witnesses:
CHARLES F. RICHARDSON,
A. I. CRAWFORD.

Copies of this patent may be obtained for five cents each, by addressing the "Commissioner of Patents, Washington, D. C."